United States Patent
Chang et al.

(10) Patent No.: US 10,048,682 B2
(45) Date of Patent: Aug. 14, 2018

(54) MOBILE ROBOT SYSTEM AND REMOTE CONTROL METHOD FOR THE SAME

(71) Applicant: Samsung Electronics Co., Ltd, Gyeonggi-do (KR)

(72) Inventors: Hwan Chang, Gyeonggi-do (KR); Hong Jun Kim, Gyeonggi-do (KR); Hee Suk Yoon, Seoul (KR); Ki Yong Lee, Gyeonggi-do (KR); Chin Woo Kang, Seoul (KR); Kyong Su Kim, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 64 days.

(21) Appl. No.: 15/132,141

(22) Filed: Apr. 18, 2016

(65) Prior Publication Data

US 2016/0306352 A1    Oct. 20, 2016

(30) Foreign Application Priority Data

Apr. 16, 2015    (KR) .................. 10-2015-0053882

(51) Int. Cl.
   *G05D 1/00* (2006.01)
   *G06F 3/0362* (2013.01)
   *B25J 11/00* (2006.01)

(52) U.S. Cl.
   CPC ......... *G05D 1/0016* (2013.01); *G06F 3/0362* (2013.01); *A47L 2201/00* (2013.01);
   (Continued)

(58) Field of Classification Search
   CPC ..................... G05D 1/0016; G06F 3/0362
   See application file for complete search history.

(56) References Cited

U.S. PATENT DOCUMENTS

| 5,324,948 A | 6/1994 | Dudar et al. |
| 6,574,536 B1 | 6/2003 | Kawagoe et al. |

(Continued)

FOREIGN PATENT DOCUMENTS

| EP | 1776623 A1 | 4/2007 |
| JP | 2001-269883 | 10/2001 |

(Continued)

OTHER PUBLICATIONS

Extended European Search Report dated Sep. 29, 2016 in connection with European Application No. 16165642.6, 7 pages.

*Primary Examiner* — Kimberly S Berona
*Assistant Examiner* — Anshul Sood

(57) ABSTRACT

A mobile robot system for allowing a user to easily input a control command of a mobile robot, and a remote control method for the same are disclosed. The mobile robot system and the remote control method thereof can allow a user to easily input control commands regarding the movement and operation of the mobile robot using the jog-dial interface, such that the possibility of causing input errors can be reduced and desired commands can be quickly and efficiently transmitted, resulting in increased user manipulation of the mobile robot system. When the user enters the rotation command of the mobile robot, the mobile robot system can allow the user to perform intuitive interfacing through shuttle manipulation, such that the mobile robot system can facilitate transmission of a movement command having a circular trajectory and the same mobile robot control as in the user-intended control is achieved, resulting in implementation of emotional interface capable of increasing user accessibility.

17 Claims, 13 Drawing Sheets

(52) U.S. Cl.
CPC ........ *A47L 2201/04* (2013.01); *B25J 11/0005* (2013.01); *G05D 2201/0215* (2013.01)

(56) References Cited

U.S. PATENT DOCUMENTS

| | | | |
|---|---|---|---|
| 7,243,746 B1 * | 7/2007 | Vasant | B60L 11/18 180/21 |
| 2001/0045809 A1 * | 11/2001 | Mukai | B25J 13/06 318/568.22 |
| 2003/0299421 | 12/2003 | Chmura et al. | |
| 2004/0073337 A1 | 4/2004 | McKee et al. | |
| 2004/0158357 A1 | 8/2004 | Lee et al. | |
| 2008/0055241 A1 | 3/2008 | Goldenberg et al. | |
| 2009/0201248 A1 | 8/2009 | Negulescu et al. | |
| 2013/0060379 A1 | 3/2013 | Choe et al. | |

FOREIGN PATENT DOCUMENTS

| | | |
|---|---|---|
| KR | 20-0258586 | 12/2001 |
| KR | 10-2006-0110479 | 10/2006 |
| KR | 10-2007-0026847 | 3/2007 |
| KR | 10-2012-0031092 | 3/2012 |
| KR | 10-2012-0050533 | 5/2012 |

* cited by examiner

MOBILE ROBOT SYSTEM AND REMOTE CONTROL METHOD FOR THE SAME

CROSS-REFERENCE TO RELATED APPLICATION

This application claims the benefit of Korean Patent Application No. 10-2015-0053882, filed on Apr. 16, 2015 in the Korean Intellectual Property Office, the disclosure of which is incorporated herein by reference.

TECHNICAL FIELD

Embodiments of the present disclosure relate to a mobile robot system for allowing a user to easily input a control command of a mobile robot, and a remote control method for the same.

BACKGROUND

Generally, a mobile robot refers to an apparatus configured to perform a task while autonomously moving in a traveling region without user's manipulation. In recent times, various mobile robots have been widely used in various technical fields according to rapid development of sensors and controllers. For example, a cleaning robot, a telepresence robot, a security robot, etc. have been used as the mobile robots.

Various methods for inputting commands regarding movement and operations of the mobile robots have been used. For example, a method for directly entering a command using an interface provided in a mobile robot and a method for entering a command using an interface provided in a remote controller through wireless communication may be used. Since the entering method using the interface provided in the mobile robot causes user inconvenience, the entering method using a remote controller is widely used to control the mobile robot.

The interface provided in the conventional remote controller is implemented to have a plurality of buttons or a touchpad shape, such that the user who uses the interface has difficulty in inputting or transmitting a desired command or information to the mobile robot. For example, when the user uses a reserved setting function, the user changes a current mode to a reservation mode in which a reserved time setting is possible through a reservation button, adjusts at least one of a date, a day of the week, a time, and a minute that are set as a default option to a desired numeral using an increase or reduction button, and finally inputs the adjusted result through a reservation complete button. As described above, the user must repeatedly perform the button pressing operation at least ten times to complete simple reservation setting. Assuming that one or more wrong numerals are pressed by the user during the above input process, the user must unavoidably return to the initial process of the above-mentioned reservation setting input procedures, resulting in greater inconvenience.

SUMMARY

Therefore, it is an aspect of the present disclosure to provide a mobile robot system for allowing a user to easily input commands regarding the movement and operation of the mobile robot using a jog-dial interface, and a remote control method for the same.

It is another aspect of the present disclosure to provide a mobile robot system for implementing intuitive interfacing through shuttle manipulation when a user enters a rotation command of the mobile robot, and a remote control method for the same.

Additional aspects of the disclosure will be set forth in part in the description which follows and, in part, will be obvious from the description, or may be learned by practice of the disclosure.

In accordance with an aspect of the present disclosure, a mobile robot system includes: a mobile robot to perform a task while in moving about a traveling region; and a device to remotely control the mobile robot, wherein the device further includes a dial to input a control command regarding movement and operation of the mobile robot, wherein the dial transmits the control command to the mobile robot using at least one of a shuttling rotation direction, a shuttling rotation angular speed, or shuttling rotation angle information.

The shuttling rotation direction may include a first rotation direction corresponding to a counterclockwise direction and a second rotation direction corresponding to a clockwise direction.

The mobile robot system may further include: a plurality of light emitting units arranged in an inner circumference of the dial, wherein the plurality of light emitting units display user input information changed according to shuttling of the dial in the first rotation direction or the second rotation direction.

The plurality of light emitting units may have different colors and different brightness levels according to the shuttling rotation direction or the shuttling rotation angular speed.

The mobile robot system may further include: a charging station to which the mobile robot returns, wherein the device further includes: a power-supply button to control power of the mobile robot; a charge return button to allow the mobile robot to return to the charging station; a mode button to change a control mode of the mobile robot; and a start/stop button to initiate, cancel, or confirm the control command.

At least one of the power-supply button, the charge return button, or the mode button may be arranged in an outer circumference of the dial.

The start/stop button may be arranged at an inside of the dial.

The control mode may include a time setting and reservation setting mode and a direct control command mode; and the dial may set a detailed control function for each of the time setting and reservation setting mode and the direct control command mode.

The dial may adjust a change amount of each setting value according to the shuttling rotation angular speed.

The dial may adjust a change amount of a time that is increased or reduced according to the shuttling rotation angular speed, during the time setting and reservation setting mode.

The dial may adjust a change amount of a rotation angular speed of the mobile robot that is increased or reduced according to the shuttling rotation angular speed, during the direct control command mode.

The device may further include left and right buttons arranged at an inside of the dial; and in the time setting and reservation setting mode, setting values may be changed through the left and right buttons.

The device may further include up and down buttons arranged at an inside of the dial; in the direct control command mode, a linear speed of the mobile robot may be changed through the up and down buttons.

The device may further include: a display unit to display user input information and an operation state of the mobile robot.

The display unit may be arranged in a center part of the dial.

In accordance with another aspect of the present disclosure, a remote control method for a mobile robot system configured to remotely control a mobile robot using a dial provided in a device includes: transmitting, by the dial, a control command regarding movement and operation of the mobile robot to the mobile robot using at least one of a shuttling rotation direction, a shuttling rotation angular speed, or shuttling rotation angle information.

The method may further include: displaying user input information adjusted according to shuttling of the dial through a plurality of light emitting units.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
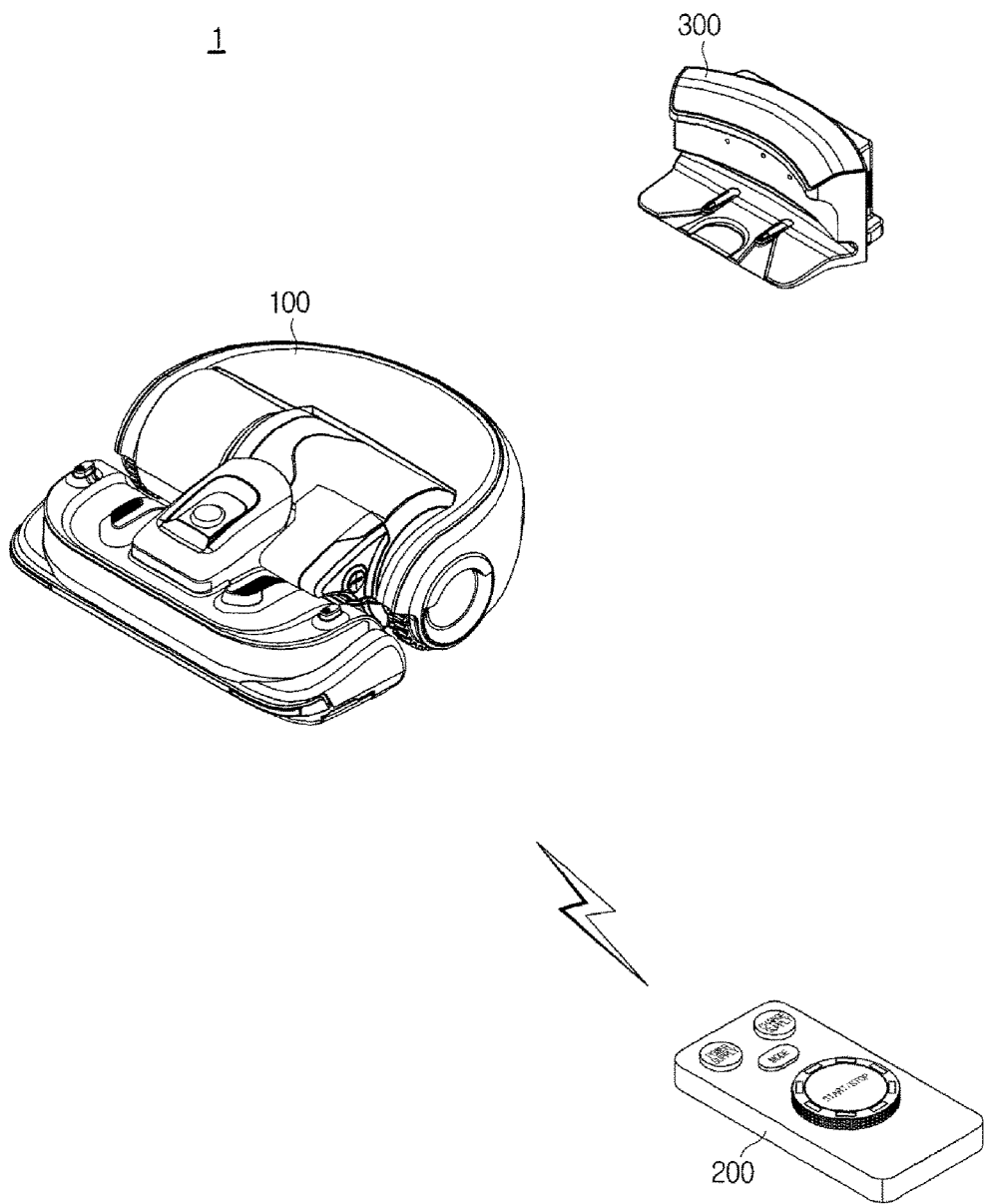
FIG. 1 is a view illustrating the entire configuration of a mobile robot system according to an embodiment of the present disclosure.

Reference will now be made in detail to the embodiments of the present disclosure, examples of which are illustrated in the accompanying drawings, wherein like reference numerals refer to like elements throughout.

FIG. 1 is a structural view illustrating a mobile robot system according to an embodiment of the present disclosure.

Referring to FIG. 1, the mobile robot system 1 according to the embodiment may include: a mobile robot 100 configured to perform a task while autonomously moving in a predetermined region, a device configured to remotely control the mobile robot 100 while being separated from the mobile robot 100, and a charging station 300 configured to charge a battery of the mobile robot 100 with electricity while being separated from the mobile robot 100.

The mobile robot 100 may refer to an apparatus configured to receive a control command from the device 200 to perform the operation corresponding to the control command. The mobile robot 100 may include a chargeable battery and an obstacle sensor through which the mobile robot 100 can avoid an obstacle during traveling, such that the mobile robot 100 can autonomously move within the task region using the obstacle sensor such that the mobile robot 100 can perform the corresponding task.

In addition, the mobile robot 100 can perform the localization and map-building process in which the mobile robot 100 recognizes its own position using a camera or various sensors without receiving information regarding the peripheral environment in advance and a map is constructed on the basis of the environmental information.

The device 200 may be implemented as a remote control device configured to wirelessly transmit a control command needed to control movement of the mobile robot 100 or perform the task of the mobile robot 100. For example, the device 200 acting as the remote control device may include a mobile phone (e.g., a cellular phone and a PCS phone), a smart phone, a personal digital assistant (PDA), a Portable Multimedia Player (PMP), a laptop computer, a digital broadcasting terminal, a Netbook, a tablet, a navigation system, etc.

In addition, the device 200 may include all kinds of devices capable of implementing various functions using various application programs, for example, a digital camera having a wired/wireless communication function, a camcorder, etc.

In addition, the device 200 may be a general simplified remote controller. Generally, the remote controller may communicate with the mobile robot 100 through infrared data association (IrDA), and as such a detailed description thereof will hereinafter be given with reference to FIGS. 3 to 5.

The charging station 300 may charge the battery of the mobile robot 100. The charging station 300 may include a guide member (not shown) configured to direct docking of the mobile robot 100. The guide member (not shown) may include a connection terminal (not shown) configured to charge a power-supply unit 130 provided in the mobile robot 100.

Figure 2:
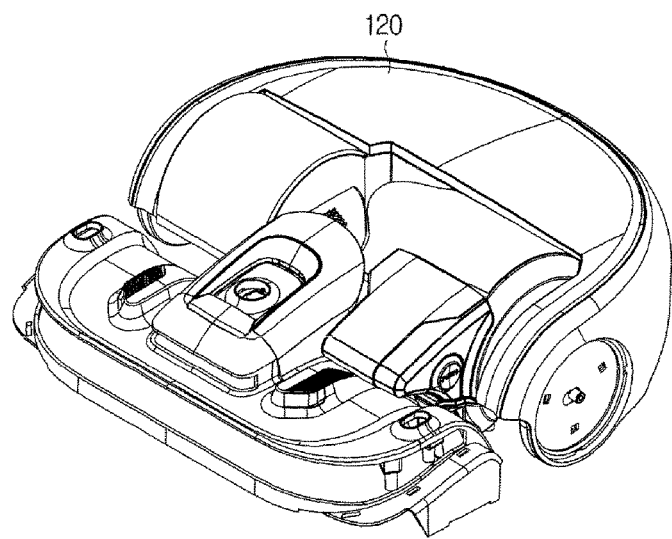
FIG. 2 is a view illustrating the external appearance of the mobile robot according to an embodiment of the present disclosure.
Figure 2:
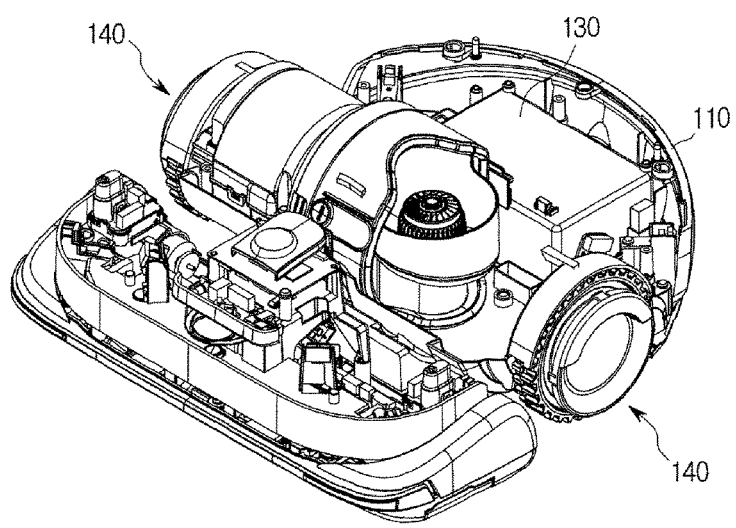

FIG. 2 is a view illustrating the external appearance of the mobile robot according to an embodiment of the present disclosure.

Referring to FIG. 2, the mobile robot 100 may include a main body 110 to form the external appearance thereof, a cover 120 to cover the top part of the main body 110, a power-supply unit 130 to provide a drive power-supply voltage for driving the main body 110, and a drive unit 140 to move the main body 110.

The main body 110 may form the external appearance of the mobile robot 100, and may support various constituent components provided therein.

The power-supply unit 130 may include a drive unit 140; and a battery electrically connected to various loads for driving the main body 110 other than the drive unit so as to provide drive power. The battery is implemented as a secondary rechargeable battery. If the main body 110 is coupled to the charging station 300 after having completed required tasks, the battery is charged with electricity after receiving power from the charging station 300.

In addition, the power-supply unit 130 may receive the charge current from the charging station 300 when the residual charge amount of the battery is insufficient, such that the power-supply unit 130 is then charged with electricity.

In addition, a caster wheel may be mounted to the front side of the main body, and the rotation angle of the caster wheel is changed according to a status of the bottom surface on which the mobile robot 100 moves. The caster wheel may be used for posture stabilization and fall prevention, may support the mobile robot 100, and may be composed of a roller or a caster-shaped wheel.

The drive unit 140 is mounted to each of both sides of the center part of the main body 110, and may move forward or backward or may rotate when the main body 110 performs a task.

Each of both drive units 140 rotates in a forward or backward direction according to a command of a robot controller 162 (see FIG. 6), such that the mobile robot 100 may move forward or backward or may rotate. For example, both drive units 140 rotate in a forward or backward direction, such that the mobile robot 100 can move forward or backward. In addition, when the left drive unit 140 rotates in a backward direction, the right drive unit 140 rotates in a forward direction, such that the mobile robot 100 can rotate to the left on the basis of the forward direction. When the right drive unit 140 rotates in a backward direction, the left drive unit 140 rotates in a forward direction, such that the mobile robot 100 can rotate to the right on the basis of the forward direction.

Figure 3:
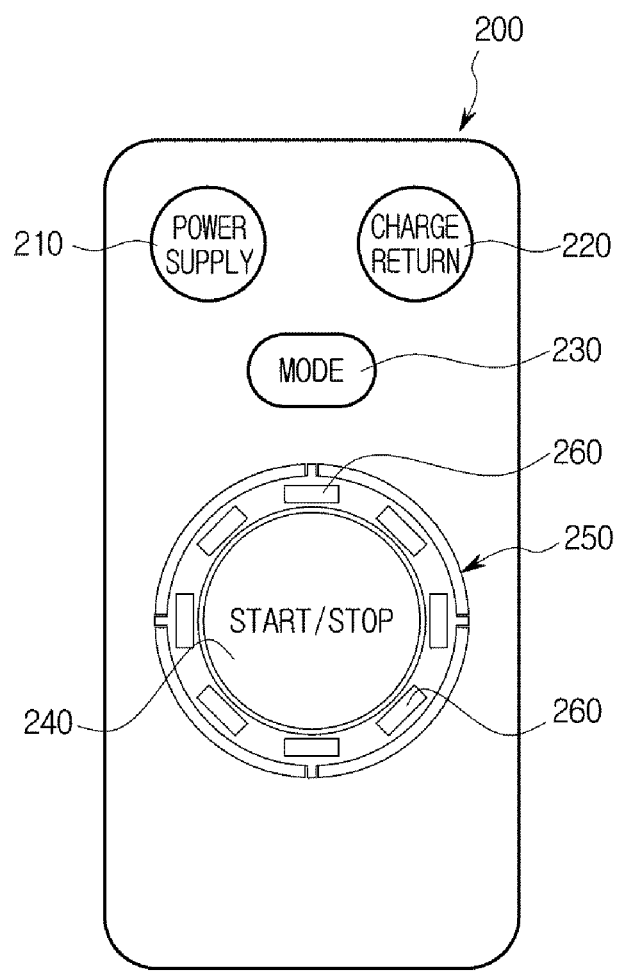
FIG. 3 is a view illustrating the external appearance of a device according to an embodiment of the present disclosure.

FIG. 3 is a view illustrating the external appearance of a device according to an embodiment of the present disclosure.

Referring to FIG. 3, the device 200 may include a plurality of buttons 210, 220, 230 and 240 and a dial 250 for receiving user's manipulation commands so as to move the mobile robot 100 as well as to control the operation of the mobile robot 100.

The plural buttons 210, 220, 230 and 240 are configured to allow the user to input control various operations of the mobile robot 100 according to user's manipulation. The above-mentioned plural buttons may include a power-supply button 210 to power the mobile robot 100 on or off, a charge return button 220 to allow the mobile robot 100 to return to the charging station 300 for battery charging, a mode button 230 to change a control mode of the mobile robot 100, and a start/stop button 240 to start or stop an operation of the mobile robot 100 as well as to initiate, cancel, and/or confirm control commands.

The power-supply button 210, the charge return button 220, and the mode button 230 among the plurality of buttons 210, 220, 230, and 240 may be located above the dial 250. The start/stop button 240 may be located at the center part of the dial 250.

The start/stop button 240 may also be mounted to a predetermined position instead of the center part of the dial 250.

The dial 250 may be located at the center part of the device 200, and may rotate to the left or right.

The dial 250 may be provided to rotate in a first rotation direction to the left and a second rotation direction to the right. The dial 250 may perform jog shuttling in the first rotation direction or the second rotation direction, so as to input user's control commands regarding the movement and control of the mobile robot 100.

In addition, the dial 250 may deliver movement and control information of the mobile robot 100 using at least one of a rotation direction, a rotation angle, and a rotation angular speed jogged by the user, such that the user can directly input the time setting command, the reservation setting command, or control commands through the dial 250.

A detailed description of the above-mentioned operation is as follows.

In the case of using a direct control command for controlling a traveling or rotation of the mobile robot 100 using the dial 250, the traveling direction or the rotation direction of the mobile robot 100 can be controlled using at least one of the shuttling rotation direction, the shuttling rotation angular speed, or the shuttling rotation angle information.

In the case of using a setting command for controlling the time setting, the reservation setting, and the speed setting using the dial 250, setting information can be input using at least one of the shuttling rotation direction, the shuttling rotation angular speed, or the shuttling rotation angle.

The device 200 according to the embodiment may arrange a plurality of light emitting units 260 in the inner circumferential surface of the dial 250.

The plurality of light emitting units 260 may display user-entered information (i.e., the shuttling rotation direction or the shuttling rotation angle) manipulated as the user jogs the dial 250 in the first rotation direction or the second rotation direction.

For example, assuming that the user performs shuttling on the dial 250 in the first rotation direction through a single one click action, the light emitting unit (i.e., a first light emitting unit arranged in a counterclockwise direction) corresponding to the shuttling position of the dial 250 among the plurality of light emitting units 260 is turned on, so that the shuttling rotation direction or shuttling rotation angle input by the user can be confirmed.

In addition, assuming that the user performs shuttling on the dial 250 in the second rotation direction through a single one click action, the light emitting unit (i.e., a first light emitting unit arranged in a clockwise direction) corresponding to the shuttling position of the dial 250 among the plurality of light emitting units 260 is turned on, so that the shuttling rotation direction or shuttling rotation angle input by the user can be confirmed.

As described above, when the user performs shuttling on the dial 250 in the first or second rotation direction, the plurality of light emitting units 260 can allow the user to easily recognize the shuttling rotation direction or shuttling rotation angle.

In addition, the plurality of light emitting units 260 may have different colors or different brightness according to the shuttling rotation direction or shuttling rotation angular speed.

For example, assuming that the user performs shuttling on the dial 250 in the first rotation direction, the light emitting units 260 are turned on in blue. Assuming that the user performs shuttling on the dial 250 in the second rotation direction, the light emitting units 260 are turned on in red.

In addition, brightness of the color may be changed according to the rotation angular speed of the dial 250.

As a result, the visual effect regarding the shuttling rotation direction can be increased, and the user accessibility to the shuttling rotation angular speed can also be improved.

Figure 4:
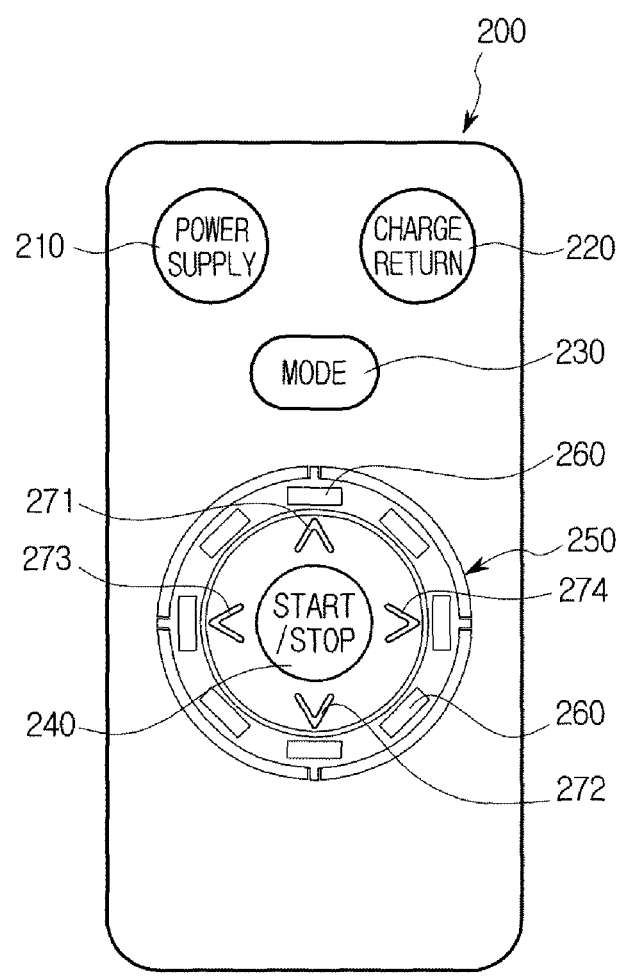
FIG. 4 is a view illustrating the external appearance of a device according to another embodiment of the present disclosure.

FIG. 4 is a view illustrating the external appearance of a device according to another embodiment of the present disclosure. Parts of FIG. 4 identical to those of FIG. 3 are denoted by the same numerals and the same names, and a detailed description thereof will not be given.

Referring to FIG. 4, the device 200 may arrange up, down, left, and right buttons 271, 272, 273 and 274 at an inside of the dial 250.

The up, down, left and right buttons 271, 272, 273, and 274 may allow the user to directly control movement of the mobile robot 100.

The user may control a traveling path of the mobile robot 100 by moving forward or backward or rotating to the left or right using the up and down buttons 271 and 272 and left and right buttons 273, and 274 provided in the device 200.

Figure 5:
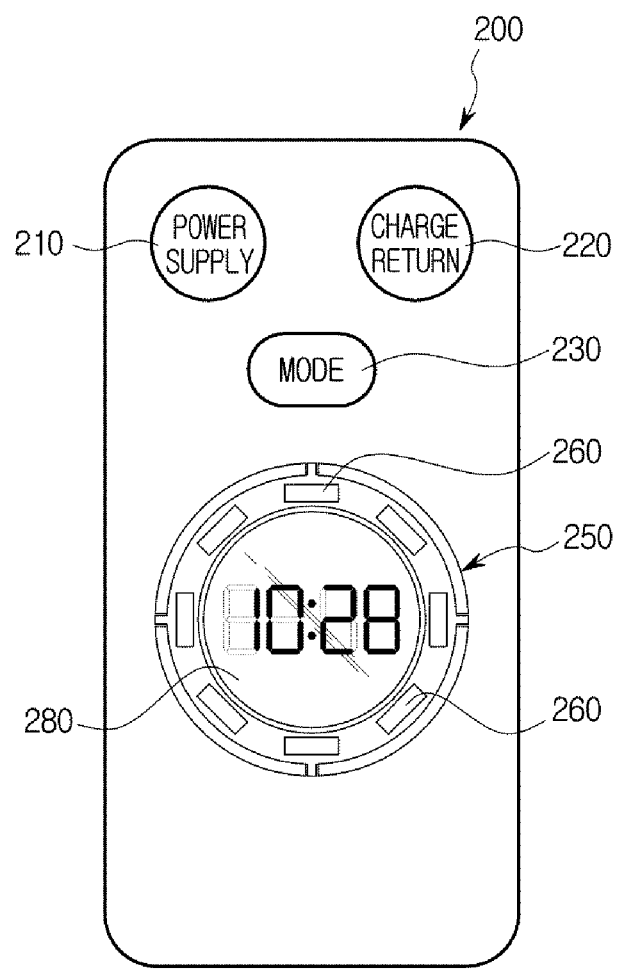
FIG. 5 is a view illustrating the external appearance of a device according to another embodiment of the present disclosure.

FIG. 5 is a view illustrating the external appearance of a device according to another embodiment of the present disclosure. Parts of FIG. 5 identical to those of FIGS. 3 and 4 are denoted by the same numerals and the same names, and a detailed description thereof will not be given.

Referring to FIG. 5, the device 200 may arrange a display unit 280 at the center part of the dial 250.

The display unit 280 may display user-input information and an operation state of the mobile robot 100.

That is, the display unit 280 may display various information received from the mobile robot 100 or various control commands entered by the user using the plurality of buttons 210, 220, 230, and 240 or the dial 250.

For example, if the user inputs the time setting command, the reservation setting command, or the direct control command, the display unit 280 may display the user-input time or the speed of the mobile robot 100 thereon. In addition, the display unit 280 may display a current time, reservation information, a battery residual amount, a movement direction, a movement path, etc.

In addition, the display unit 280 may include at least one of a liquid crystal display (LCD), a thin film transistor-liquid crystal display (TFT-LCD), an organic light emitting diode (OLED), a flexible display, a three-dimensional (3D) display, etc.

In addition, a magnet is mounted to at least one surface (e.g., a back surface) of the device 200, such that the magnet may be attached to the mobile robot 100 or other electronic devices.

When the device 200 is mounted to the electronic device or the mobile robot 100, the function of the device 200 may be changed or limited.

In the meantime, although the device 200 according to the embodiment has exemplarily disclosed that the display unit 280 is arranged at the center part of the dial 250, the scope or spirit of the present disclosure is not limited thereto, and the same purposes or effects as in the present disclosure can also be achieved even when the display unit 280 is located above the dial 250.

In addition, although the device 200 according to the embodiment has exemplarily disclosed that several light emitting units 260 are arranged at the inner circumferential surface of the dial 250 for convenience of description, the scope or spirit of the present disclosure is not limited thereto, and the same purposes or effects as in the present disclosure can also be achieved even when the light emitting units 260 are arranged at the outer periphery region of the dial 250.

Although the device 200 according to the embodiment has exemplarily disclosed that several buttons are arranged above the dial 250 for convenience of description, the scope or spirit of the present disclosure is not limited thereto, and the plural buttons 210, 220, and 230 can be arranged at a side surface of the device 200. A detailed description thereof will hereinafter be given with reference to FIGS. 6 and 7.

Figure 6:
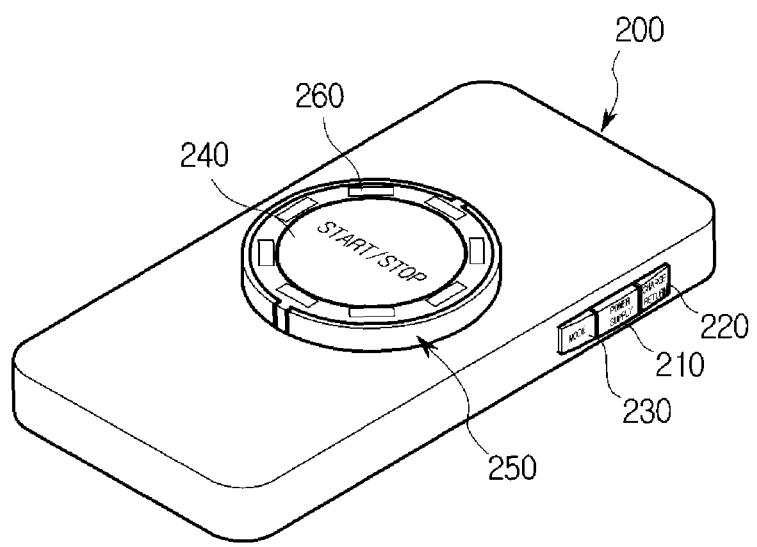
FIG. 6 is a view illustrating the external appearance of a device according to another embodiment of the present disclosure.
Figure 7:
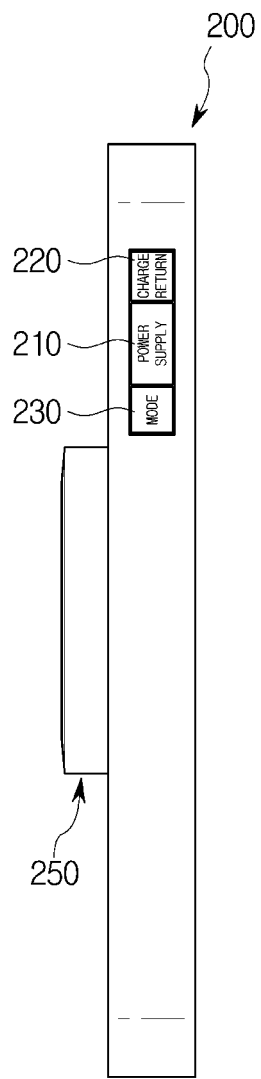
FIG. 7 is a side view illustrating the device shown in FIG. 6.

FIG. 6 is a view illustrating the external appearance of a device according to another embodiment of the present disclosure. FIG. 7 is a side view illustrating the device shown in FIG. 6.

As can be seen from FIGS. 6 and 7, the plurality of buttons 210, 220, and 230 may be arranged at the side surface of the device 200.

In addition, the device 200 according to the embodiment may arrange the plurality of buttons 210, 220, and 230 at an outer circumferential surface of the dial 250, and as such a detailed description thereof will hereinafter be described with reference to FIGS. 8 and 9.

Figure 8:
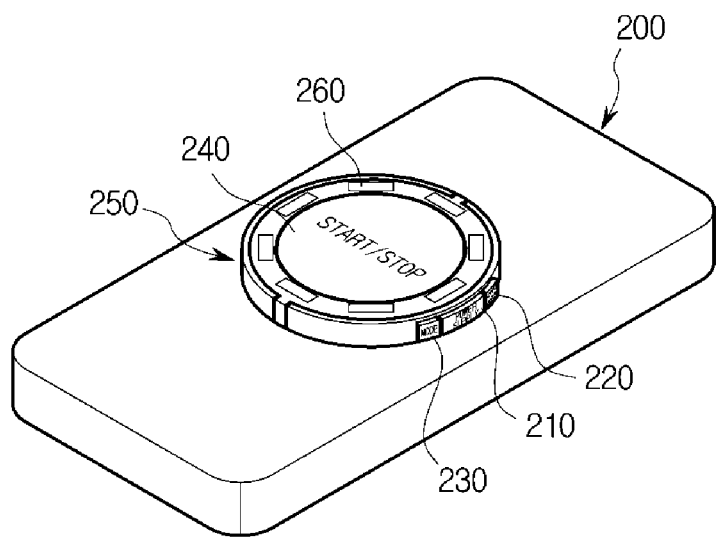
FIG. 8 is a view illustrating the external appearance of a device according to another embodiment of the present disclosure.

FIG. 8 is a view illustrating the external appearance of a device according to another embodiment of the present disclosure. FIG. 9 is a side view illustrating the device shown in FIG. 8.

Figure 9:
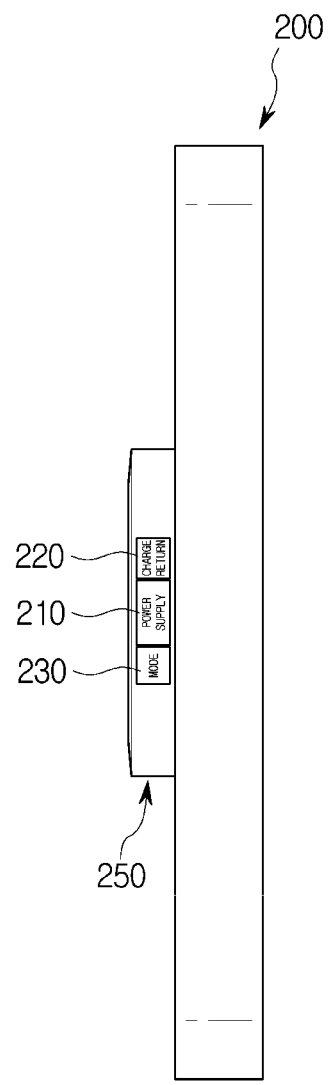
FIG. 9 is a side view illustrating the device shown in FIG. 8.

As can be seen from FIGS. 8 and 9, the plurality of buttons 210, 220, and 230 may be arranged at the outer circumferential surface of the dial 250.

Figure 10:
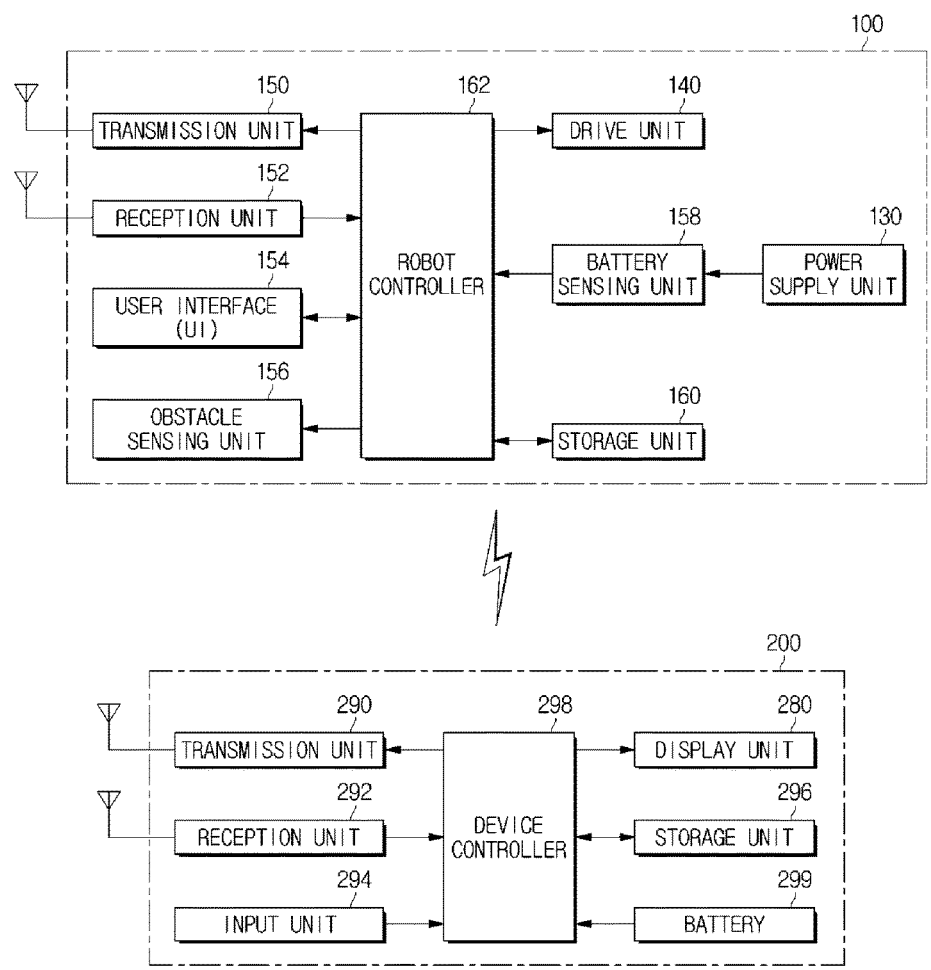
FIG. 10 is a block diagram illustrating a remote control of a mobile robot system according to an embodiment of the present disclosure.

FIG. 10 is a block diagram illustrating a remote control of a mobile robot system according to an embodiment of the present disclosure.

Referring to FIG. 10, the mobile robot 100 may further include not only the above-mentioned constituent elements shown in FIG. 2, but also a transmission unit 150, a reception unit 152, a user interface (UI) 154, an obstacle sensing unit 156, a battery sensing unit 158, a storage unit 160, and a robot controller 162.

The drive unit 140 may drive both drive wheels mounted to the lower part of the mobile robot main body 110 in such a manner that the mobile robot 100 can autonomously move in the traveling region without colliding with the wall or obstacle on the basis of information regarding the obstacle detected by the obstacle sensing unit 156 and at the same time can change a current traveling direction to another direction.

The transmission unit 150 may transmit a response signal with respect to a remote control signal of the device 200, operation state information of the mobile robot 100, captured image information, current position information, traveling information, etc. to the device 200.

The reception unit 152 may receive a remote control signal regarding the movement and operation of the mobile robot 100 from the device 200.

The transmission unit 150 is mounted to the top surface of the mobile robot main body 110, and implemented using use a 360° diffusion lens to omnidirectionally transmit infrared light. The reception units 152 are mounted to the front and side surfaces of the mobile robot main body 119 at intervals of a predetermined distance, and implemented using a 180° diffusion lens configured to omnidirectionally receive infrared light or using a remote-controller reception module having low power consumption.

The user interface (UI) 154 may be implemented as a display unit for displaying a manipulation state or as a plurality of buttons for allowing a user to input a task execution command. Through the user interface (UI) 154, the user can manually control the mobile robot 100 and can also recognize the current operation state of the mobile robot 100.

The obstacle sensing unit 156 may detect various obstacles (e.g., furniture, office supplies, and walls) located in the traveling region of the mobile robot 100. The obstacle sensing unit 156 may emit ultrasonic waves to the traveling path of the mobile robot 100, receive the ultrasonic waves reflected from the obstacle, and thus detect the presence or absence of the obstacle and the distance to the obstacle. In this case, the obstacle sensing unit 156 may be implemented as the infrared sensor that includes a plurality of infrared light emitting elements to transmit the infrared light and a plurality of infrared light receiving elements to receive the infrared light reflected from the obstacle.

The battery sensing unit 158 may detect the residual charge amount of the power-supply unit 130 configured to supply a drive power-supply voltage to the mobile robot 100, such that it can transmit information regarding the detected residual charge amount to the robot controller 162.

The storage unit 160 may be a memory configured to store the operation program for driving the mobile robot 100, the traveling pattern, mobile robot's position information obtained from the traveling process, obstacle information, etc. therein.

In addition, the storage unit 160 may store control data for controlling the operation of the mobile robot 100, reference data needed for operation control of the mobile robot 100, and operation data generated during execution of a predetermined operation of the mobile robot 100, and may also store user input information (e.g., setting data) entered by the user interface 154 or the device 200 by which the mobile robot 100 can perform the predetermined operation The robot controller 162 acting as a microprocessor configured to control overall operation of the mobile robot 100 may control the transmission unit 150 to transmit a signal for transmitting the operation state of the mobile robot 100. Upon receiving the remote control signal from the device 200, the reception unit 152 may control the movement and operation of the mobile robot 100 according to a user command entered using the device 200.

In FIG. 10, the device may further include not only the constituent elements shown in FIG. 3, but also a transmission unit 290, a reception unit 292, an input unit 294, a storage unit 296, a device controller 298, and a battery 299.

The transmission unit 290 may transmit not only a response signal with respect to a radio frequency (RF) signal of the mobile robot 100, but also a remote control signal of the user input information regarding the movement and operation of the mobile robot 100 to the robot 100.

The reception unit 292 may receive operation status information, captured image information, current position information, etc. from the mobile robot 100.

The transmission unit 290 may use the 180° diffusion lens to omnidirectionally transmit infrared light. The reception unit 292 may use the omnidirectional reception lens (omni-directional receiver) to receive signals from the mobile robot 100 in the range of 360° (i.e., the omnidirectional range).

The input unit 294 may input user commands regarding the movement and operation of the mobile robot 100, and may include keys, buttons, touchpad, etc. The input unit 294 may include all kinds of devices to generate predetermined input data through user manipulation, for example, pushing, contacting, pressure, rotation, etc.

As can be seen from FIGS. 3 to 5, the input unit 294 exemplarily includes the plurality of buttons 210, 220, 230, and 240 and the dial 250.

The storage unit 296 may store a program needed to operate the device controller 298 therein.

In addition, the storage unit 296 may store input/output (I/O) data therein. The storage unit 296 may previously construct a pattern composed of both a remote control signal for controlling the mobile robot 100 and a control command corresponding to the remote control signal, and then store the constructed pattern therein.

The device controller 298 may be implemented as a microprocessor to control overall operation of the device 200 in response to user input information received from the input unit 194, and may generate the remote control signal regarding the movement or operation of the mobile robot 100 according to the communication protocol associated with the mobile robot 100.

In addition, the device controller 298 may control the transmission unit 290 to transmit the remote control signal of the mobile robot 100. Upon receiving the response signal from the mobile robot 100, the device controller 298 may control the movement and operation of the mobile robot 100 according to the user command received from the input unit 294.

The battery 299 may provide drive power to the device 200.

Referring to FIG. 10, transceivers 150, and 152 of the mobile robot 100 and transceivers 290, and 292 of the device 200 may perform signal transmission/reception between the mobile robot 100 and the device 200 through IrDA (infrared Data Association), Bluetooth RFID (Radio Frequency Identification), etc.

In addition, the mobile robot 100 and the device 200 can communicate with each other using a near field communication (NFC) protocol (e.g., Ultra Wideband (UWB), Zig-Bee, etc.), a wireless Internet protocol (e.g., Wi-Fi, Wireless Broadband (Wibro), World Interoperability for Microwave Access (Wimax), etc.), an interface protocol (e.g., a Universal Serial Bus (USB), etc.), or various communication links (e.g., a mobile communication network, a Wide Area Network (WAN), or P2P phone circuit connection).

The mobile robot system and the remote control method for the same according to the embodiment will hereinafter be described in detail.

Figure 11:
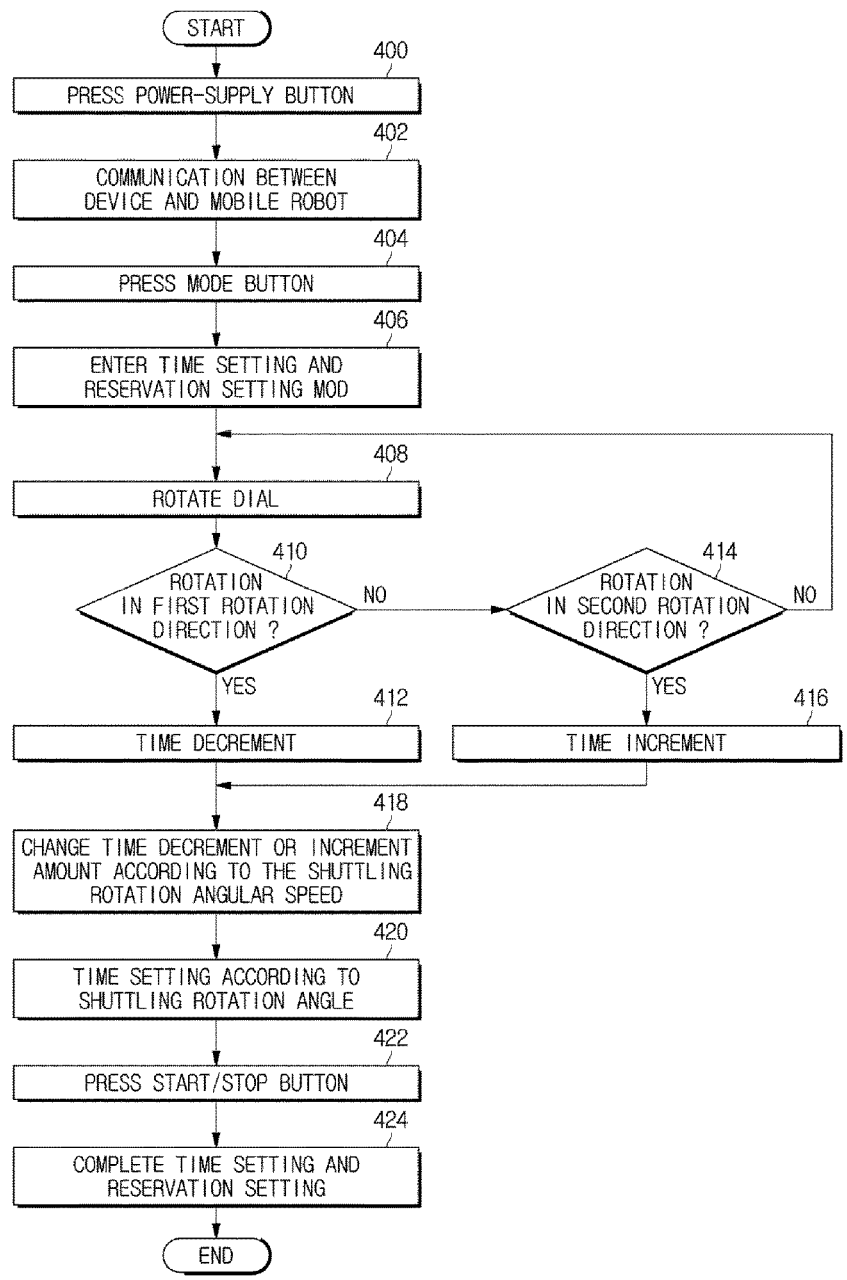
FIG. 11 is a flowchart illustrating a first control algorithm for performing time setting and reservation setting using a dial of a mobile robot system according to an embodiment of the present disclosure.

FIG. 11 is a flowchart illustrating a first control algorithm for performing time setting and reservation setting using a dial of a mobile robot system according to an embodiment of the present disclosure.

Referring to FIG. 11, the user may push or press the power-supply button 210 among the plurality of buttons 210, 220, 230, and 240 provided in the device 200 (S400).

If the power-supply button 210 is pressed, the mobile robot 100 is powered on.

If the mobile robot 100 is powered on, the transceivers 150 and 152 of the mobile robot 100 communicate with the transceivers 290 and 292 of the device 200 such that the mobile robot 100 can communicate with the device 200 (S402).

Subsequently, the user may press the mode button 230 among the plurality of buttons 210, 220, 230, and 240 provided in the device 200 (S 404).

If the mode button 230 is pressed, the device controller 298 may enter the time setting and reservation setting mode (S406).

If the device controller 298 enters the time setting and reservation setting mode, the time information may be adjusted using at least one of the shuttling rotation direction of the dial, the shuttling rotation angular speed, or the shuttling rotation angle information.

If the device controller 298 enters the time setting and reservation setting mode, the user may rotate the dial 250 provided in the device 200 and thus adjust the time.

A method for performing time adjustment through manipulation of the dial 250 is as follows.

First, the user may perform time adjustment by rotating the dial 250 in the first rotation direction (i.e., the counterclockwise direction) or in the second rotation direction (i.e., the clockwise direction) (S408).

If the user performs jog-shuttling on the dial 250 in the first or second rotation direction, the device controller 298 determines whether the dial 250 is jogged in the first rotation direction (S410).

If the dial 250 is determined to be jogged in the first rotation direction in operation 410, the device controller 298 performs time adjustment by reducing a current time (S412).

If the dial 250 is not determined to be jogged in the first rotation direction in operation 410, the device controller 298 determines whether the dial 250 is jogged in the second rotation direction (S414).

If the dial 250 is determined to be jogged in the second rotation direction in operation 414, the device controller 298 performs time adjustment by increasing a current time (S416).

If the dial 250 is not determined to be jogged in the second rotation direction in operation 414, the device controller 298 returns to operation 408 and enters a standby mode until the dial 250 is jogged in the first or second rotation direction.

As described above, the user may reduce or increase the current time by performing jog-shuttling on the dial 250 in the first or second rotation direction.

In addition, the device controller 298 may change the change amount (i.e., time decrement amount or time increment amount) of the current time that is reduced or increased according to the shuttling rotation angular speed in the first or second rotation direction of the dial 250 (S418.)

For example, if the shuttling action is achieved at a high speed, the change amount of the time to be reduced or increased is increased. If the shuttling action is achieved at a low speed, the change amount of the time to be reduced or increased is decreased.

As described above, since the time decrement amount or the time increment amount is changed according to the rotation angular speed at which the dial 250 is jogged in the first or second rotation direction, the device controller 298 may adjust a desired time according to the shuttling rotation angle (S420).

For example, when the dial 250 is jogged in the second rotation direction by an angle of 90 degrees, a current time may be set to 3 o'clock.

If the user desires set the next time to be adjusted in a subsequent process after completion of the current time setting, the user may change the time setting to be adjusted by pressing the start/stop button 240 or the left and right buttons 273 and 274 among the plurality of buttons 210, 220, 230, and 240 provided in the device 200.

For example, after a current time is completely set in the time setting process, the user may enter the date or minute setting mode by pressing the left and right buttons 273 and 274.

Besides, the user may adjust the time and minute setting through only the rotation action of the dial 250.

If the desired time setting is achieved as described above, the user may press the start/stop button 240 (S422).

If the user presses the start/stop button 240, the device controller 298 may complete the time setting and reservation setting operation and then complete the operation (S424).

On the other hand, although the embodiment has exemplarily disclosed that a time is reduced when the dial 250 is jogged in the first rotation direction or the time is increased when the dial 250 is jogged in the second rotation direction for convenience of description, the scope or spirit of the present disclosure is not limited thereto, the above time decrement shuttling direction and the above time increment shuttling direction may be replaced with each other.

In addition, although the embodiment has exemplarily disclosed that the time setting and reservation setting operations are completed by pressing the start/stop button 240 for convenience of description, the scope or spirit of the present disclosure is not limited thereto, and the time setting and reservation setting can be achieved by pressing the charge return button 220. In addition, the time setting and reservation setting can also be completed using a pressed time of a certain button from among the plurality of buttons 210, 220, 230, and 240.

Figure 12A:
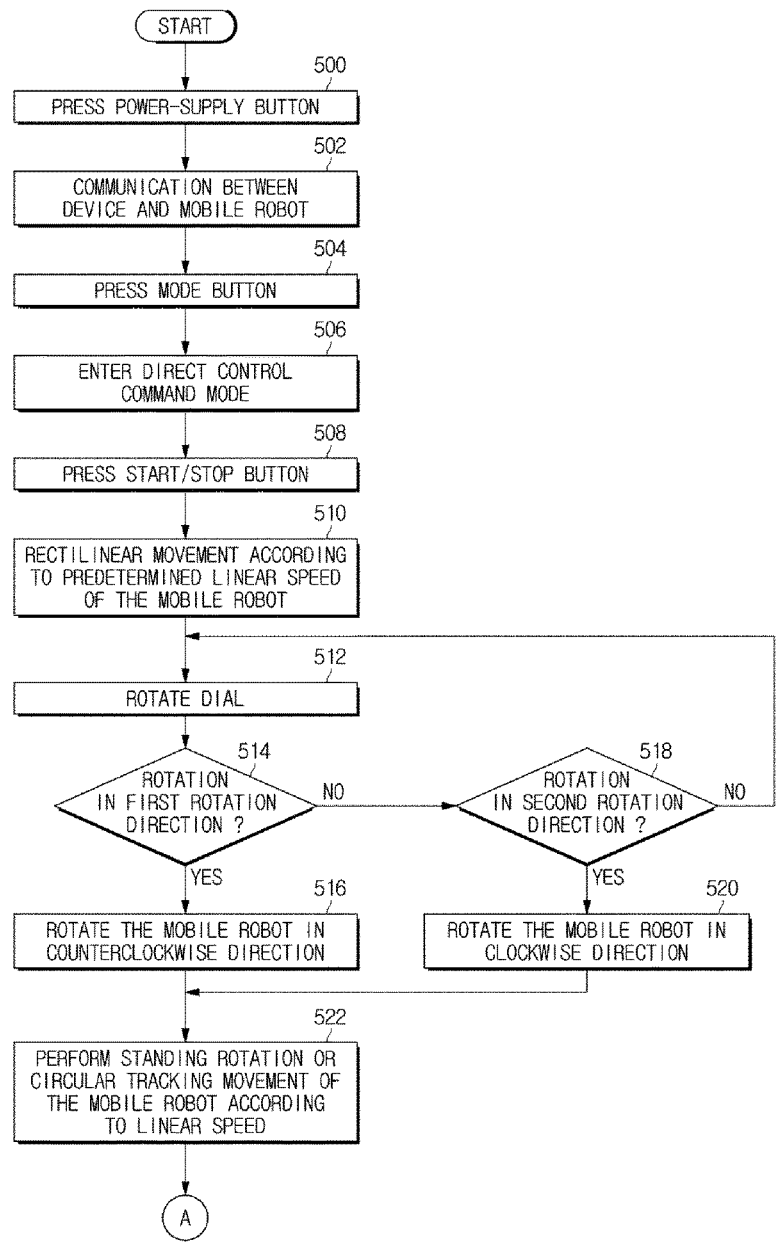
FIGS. 12A and 12B are flowcharts illustrating a second control algorithm for directly inputting a control command using a dial of the mobile robot system according to an embodiment of the present disclosure.
Figure 12B:
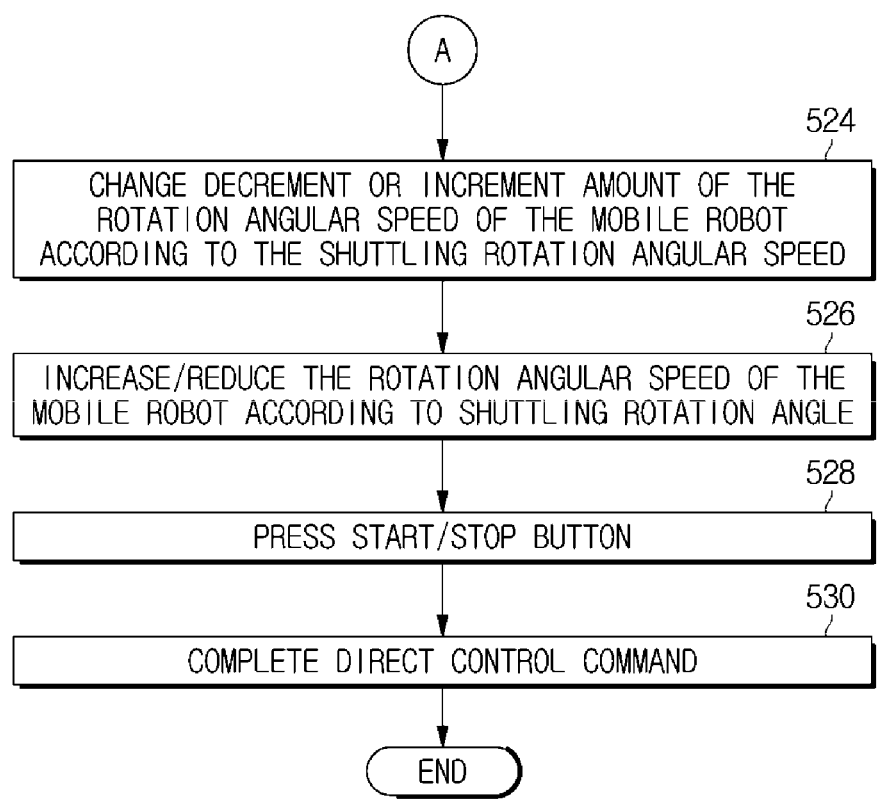

FIGS. 12A and 12B are flowcharts illustrating a second control algorithm for directly inputting a control command using a dial of the mobile robot system according to an embodiment of the present disclosure.

Referring to FIGS. 12A and 12B, the user may press the power-supply button 210 provided in the device 200 in operation 500.

If the user presses the power-supply button 210, the mobile robot 100 is powered on.

If the mobile robot 100 is powered on, the transmission units 50 and 152 of the mobile robot 100 can communicate with the transmission units 290 and 292 of the device 200 such that the mobile robot 100 can also communicate with the device 200 (S502).

Subsequently, the user may press the mode button 230 provided in the device 200 (S504).

If the mode button 230 is pressed, the device controller 298 may enter the direct control command mode (S506).

If the device controller 298 enters the direct control command mode, the rotation angular speed of the mobile robot 100 may be controlled using at least one of the shuttling rotation direction of the dial 250, the shuttling rotation angular speed, or the shuttling rotation angle information.

If the device controller 298 enters the direct control command mode, the user may press the start/stop button 240 provided in the device 200 (S508).

If the start/stop button 240 is pressed, the mobile robot 100 may start straight line movement according to the predetermined linear velocity (S510). In this case, the linear velocity may be predetermined through shuttling prior to execution of the direct control command, or may be increased or decreased by pressing the up and down buttons 271 and 272.

For example, if the user presses the down button 272 when the mobile robot 100 moves straight at 100 mm/s, the mobile robot 100 may travel at a linear velocity of 90 mm/s.

When the mobile robot 100 moves straight according to the predetermined linear velocity as described above, the user may control the rotation angular speed of the mobile robot 100 by rotating the dial 250 provided in the device 200.

A method for controlling the rotation angular speed of the mobile robot 100 by rotating the dial 250 will hereinafter be described with reference to the accompanying drawings.

First, the user rotates the dial 250 in the first rotation direction (i.e., the counterclockwise direction) or in the second rotation direction (i.e., the clockwise direction), such that the rotation angular speed of the mobile robot 100 is controlled (S512).

If the user performs jog-shuttling on the dial 250 in the first rotation direction or in the second rotation direction, the device controller 298 may determine whether the dial 250 is jogged in the first rotation direction (S514).

If the dial 250 is determined to be jogged in the first rotation direction in operation 514, the robot controller 162 rotates the mobile robot 100 in the counterclockwise direction by increasing the rotation angular speed in a positive direction (S516).

In the meantime, if the dial 250 is not determined to be jogged in the first rotation direction in operation 514, the device controller 298 determine whether the dial 250 is jogged in the second rotation direction (S518).

If the dial 250 is determined to be jogged in the second rotation direction in operation 518, the robot controller 162 may rotate the mobile robot 100 in the clockwise direction by increasing the rotation angular speed in a negative direction (S520).

If the dial 250 is not determined to be jogged in the second rotation direction in operation 518, the device controller 298 returns to the operation 512 and enters a standby mode until the dial 250 is jogged in the first or second rotation direction.

As described above, the user may rotate the mobile robot 100 in the counterclockwise or clockwise direction by performing shuttling on the dial 250 in the first or second rotation direction.

In this case, the mobile robot 100 may rotate in place or may perform circular tracking movement in the counterclockwise or clockwise direction depending on the linear speed (S522).

In addition, the device controller 298 may change the change amount of the rotation angular speed (i.e., the decrement or increment amount of the rotation angular speed) of the mobile robot 100 rotating in the counterclockwise or clockwise direction according to the shuttling rotation angular speed of rotating the dial 250 in the first or second rotation direction (S524).

For example, if the shuttling rotation is performed at a high speed, the change amount of the increasing or reducing of rotation angular speed of the mobile robot 100 is increased. For example, if the shuttling rotation is performed at a low speed, the change amount of the increasing or reducing of rotation angular speed of the mobile robot 100 is decreased.

As described above, since the decrement or increment amount of the rotation angular speed is changed according to the rotation angular speed at which the dial 250 is jogged in the first or second rotation direction, the device controller 298 may increase or reduce the rotation angular speed of the mobile robot 100 according to the shuttling rotation angle (S526).

Meanwhile, when the traveling direction of the mobile robot 100 is identical to the shuttling rotation angle, no rotation angular speed is applied.

After the rotation angular speed of the mobile robot 100 is controlled as described above, the user may press the start/stop button 240 (S528).

If the start/stop button 240 is pressed, the device controller 298 completes the direct control command of the mobile robot 100 and then finishes all processes (S530).

Although the embodiment has exemplarily disclosed that the mobile robot 100 rotates in the counterclockwise direction when the dial 250 is jogged in the first rotation direction and the mobile robot 100 rotates in the clockwise direction when the dial 250 is jogged in the second rotation direction for convenience of description, the scope or spirit of the present disclosure is not limited thereto, and it should be noted that the rotation direction of the mobile robot 100 can also be reversed according to the rotation manipulation of the dial 250.

In addition, although the embodiment has exemplarily disclosed that the direct control command of the mobile robot 100 is completed by pressing the start/stop button 240 for convenience of description, the scope or spirit of the present disclosure is not limited thereto, the direct control command may be completed by pressing the charge return button 220, or may also be completed using the pressed time of a certain button among the plurality of buttons 210, 220, 230 and 240.

As is apparent from the above description, the mobile robot system and the remote control method thereof according to the embodiments can allow a user to easily input control commands regarding the movement and operation of the mobile robot using the jog-dial interface, such that the possibility of causing input errors can be reduced and desired commands can be quickly and efficiently transmitted, resulting in increased user manipulation of the mobile robot system.

In addition, when the user enters the rotation command of the mobile robot, the mobile robot system can allow the user to perform intuitive interfacing through shuttle manipulation, such that transmission of a movement command having a circular trajectory and the control of the mobile robot is achieved consistent with the user's intention, resulting in implementation of emotional interface capable of increasing user accessibility.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A mobile robot system comprising:
    a mobile robot configured to perform a task while moving in a traveling region; and
    a device configured to remotely control the mobile robot, wherein the device further includes:
        a dial configured to input a control command regarding movement and operation of the mobile robot, and
        a mode button configured to change a control mode of the mobile robot,
    wherein in a first control mode the dial transmits the control command to the mobile robot to directly control a direction of movement of the mobile robot, and in a second control mode the dial transmits the control command to the mobile robot to set a time of operation,
    wherein the transmitted control command indicates a change in the movement and operation of the mobile robot in proportion to a detected magnitude of a change of the dial by at least one of a shuttling rotation direction, a shuttling rotation angular speed, or shuttling rotation angle information.

2. The mobile robot system according to claim 1, wherein the shuttling rotation direction includes a first rotation direction corresponding to a counterclockwise direction and a second rotation direction corresponding to a clockwise direction.

3. The mobile robot system according to claim 2, further comprising:
    a plurality of light emitting units arranged in an inner circumference of the dial,
    wherein the plurality of light emitting units display user input information changed according to shuttling of the dial in the first rotation direction or the second rotation direction.

4. The mobile robot system according to claim 3, wherein the plurality of light emitting units have different colors and different brightness levels according to the shuttling rotation direction or the shutting rotation angular speed.

5. The mobile robot system according to claim 1, further comprising:
a charging station configured to which the mobile robot returns,
wherein the device further includes:
a power-supply button configured to control power of the mobile robot;
a charge return button configured to allow the mobile robot to return to the charging station; and
a start/stop button configured to initiate, cancel, or confirm the control command.

6. The mobile robot system according to claim 5, wherein at least one of the power-supply button, the charge return button, or the mode button is arranged in an outer circumference of the dial.

7. The mobile robot system according to claim 5, wherein the start/stop button is arranged in an inside of the dial.

8. The mobile robot system according to claim 1, wherein the dial adjusts a change amount of each setting value according to the shuttling rotation angular speed.

9. The mobile robot system according to claim 8, wherein the dial adjusts a change amount of a time that is increased or reduced according to the shuttling rotation angular speed, during the second control mode.

10. The mobile robot system according to claim 8, wherein the dial adjusts a change amount of a rotation angular speed of the mobile robot that is increased or reduced according to the shuttling rotation angular speed, during the first control mode.

11. The mobile robot system according to claim 1, wherein:
the device further includes left and right buttons arranged at an inside of the dial; and
in the second control mode, setting values are changed through the left and right buttons.

12. The mobile robot system according to claim 1, wherein:
the device further includes up and down buttons arranged at an inside of the dial; and
in the first control mode, a linear speed of the mobile robot is changed through the up and down buttons.

13. The mobile robot system according to claim 1, wherein the device further includes:
a display unit configured to display user input information and an operation state of the mobile robot.

14. The mobile robot system according to claim 13, wherein the display unit is arranged in a center part of the dial.

15. A remote control method for a mobile robot system configured to remotely control a mobile robot using a dial provided in a device, the remote control method comprising:
transmitting to the mobile robot, by the dial in a first control mode, a first control command to directly control a direction of movement of the mobile robot, and by the dial in a second control mode, a second control command to set a time of operation of the mobile robot,
wherein the transmitted first and second control commands indicate a change in the direction of movement and the time of operation of the mobile robot in proportion to a magnitude of a detected change of the dial by at least one of a shuttling rotation direction, a shuttling rotation angular speed, or shuttling rotation angle information.

16. The remote control method according to claim 15, further comprising:
displaying user input information adjusted according to shuttling of the dial through a plurality of light emitting units.

17. The remote control method according to claim 15, wherein the dial adjusts a change amount of each setting value changed according to the shuttling rotation angular speed.

* * * * *